(12) United States Patent
Agarwal et al.

(10) Patent No.: US 11,550,634 B2
(45) Date of Patent: Jan. 10, 2023

(54) CAPACITY MANAGEMENT IN A CLOUD COMPUTING SYSTEM USING VIRTUAL MACHINE SERIES MODELING

(71) Applicant: Microsoft Technology Licensing, LLC, Redmond, WA (US)

(72) Inventors: Saurabh Agarwal, Redmond, WA (US); Maitreyee Ramprasad Joshi, Seattle, WA (US); Vinayak Ramnath Karnataki, Kirkland, WA (US); Neha Keshari, Bellevue, WA (US); Gowtham Natarajan, Redmond, WA (US); Yash Purohit, Bothell, WA (US); Sanjay Ramanujan, Sammamish, WA (US); Karthikeyan Subramanian, Redmond, WA (US); Ambrose Thomas Treacy, Woodinville, WA (US); Shandan Zhou, Kenmore, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 399 days.

(21) Appl. No.: 16/297,350

(22) Filed: Mar. 8, 2019

(65) Prior Publication Data

US 2020/0285525 A1 Sep. 10, 2020

(51) Int. Cl.
*G06F 9/50* (2006.01)
*G06F 11/30* (2006.01)
(Continued)

(52) U.S. Cl.
CPC ........ *G06F 9/5077* (2013.01); *G06F 11/3024* (2013.01); *G06F 11/3495* (2013.01); *G06N 5/04* (2013.01); *G06F 2209/508* (2013.01)

(58) Field of Classification Search
CPC ............... G06F 9/5077; G06F 11/3024; G06F 11/3495; G06F 2209/5011; G06F 2209/208
See application file for complete search history.

(56) References Cited

U.S. PATENT DOCUMENTS 6,597,907 B1 * 7/2003 Pruitt .................. H04L 41/0681
455/423
8,312,460 B1 11/2012 Blanding
(Continued)

OTHER PUBLICATIONS

Glantz et al., Extrapolation, Credit Engineering for Bankers (2nd edition), 2011 (Year: 2011).*
(Continued)

*Primary Examiner* — Lewis A Bullock, Jr.
*Assistant Examiner* — Kevin X Lu
(74) *Attorney, Agent, or Firm* — Ray Quinney & Nebeker P.C; James Bullough

(57) ABSTRACT

A method for minimizing allocation failures in a cloud computing system without overprovisioning may include determining a predicted supply for a virtual machine series in a system unit of the cloud computing system during an upcoming time period. The predicted supply may be based on a shared available current capacity and a shared available future added capacity for the virtual machine series in the system unit. The method may also include predicting an available capacity for the virtual machine series in the system unit during the upcoming time period. The predicted available capacity may be based at least in part on a predicted demand for the virtual machine series in the system unit during the upcoming time period and the predicted supply. The method may also include taking at least one mitigation action in response to determining that the predicted demand exceeds the predicted supply during the upcoming time period.

20 Claims, 10 Drawing Sheets

(51) Int. Cl.
*G06F 11/34* (2006.01)
*G06N 5/04* (2006.01)

(56) References Cited

U.S. PATENT DOCUMENTS

| | | | |
|---|---|---|---|
| 8,903,983 B2* | 12/2014 | Bakman | G06F 11/008 |
| | | | 709/224 |
| 10,042,676 B1* | 8/2018 | Wei | G06F 9/5077 |
| 10,164,897 B1* | 12/2018 | Gussin | H04L 67/16 |
| 10,776,091 B1* | 9/2020 | Wagner | G06F 8/447 |
| 2014/0310235 A1* | 10/2014 | Chan | G06F 16/285 |
| | | | 707/603 |
| 2015/0309915 A1* | 10/2015 | Ajith Kumar | G06F 11/3636 |
| | | | 717/128 |
| 2015/0378753 A1 | 12/2015 | Phillips et al. | |
| 2016/0283271 A1* | 9/2016 | Ashby, Jr. | G06F 9/5072 |
| 2017/0322834 A1* | 11/2017 | de Sene | G06F 9/5066 |
| 2018/0060205 A1* | 3/2018 | Raj | G06F 11/3452 |
| 2019/0286494 A1* | 9/2019 | Sampson | G06F 9/5077 |
| 2020/0218571 A1* | 7/2020 | Chen | H04L 47/70 |

OTHER PUBLICATIONS

Examiner Search note on "linear regression forecasting", 2021 (Year: 2021).*

"International Search Report and Written Opinion Issued in PCT Application No. PCT/US2020/019728", dated Date May 26, 2020, 32 Pages.

Shen et al., "CloudScale: Elastic Resource Scaling For Multi-Tenant Cloud Systems", In Proceedings of the 2nd ACM Symposium on Cloud Computing, Oct. 27, 2011, 14 pages.

* cited by examiner

CAPACITY MANAGEMENT IN A CLOUD COMPUTING SYSTEM USING VIRTUAL MACHINE SERIES MODELING

CROSS-REFERENCE TO RELATED APPLICATIONS

N/A

BACKGROUND

Cloud computing is the delivery of computing services (e.g., servers, storage, databases, networking, software, analytics) over the Internet. Broadly speaking, a cloud computing system includes two sections, a front end and a back end, that are in communication with one another via the Internet. The front end includes the interface that users encounter through a client device. The back end includes the resources that deliver cloud-computing services, including processors, memory, storage, and networking hardware.

The back end of a cloud computing system typically includes a plurality of datacenters, which may be located in different geographical regions. Each datacenter typically includes a large number (e.g., thousands) of servers, which may be organized into different clusters. Each server may be used to run one or more virtual machines. In this context, the term "server" refers to a physical computer system, while the term "virtual machine" (VM) refers to an emulation of a computer system on a server. In other words, a VM is a program running on a server that acts like a virtual computer. Like a physical computer, a VM runs an operating system and one or more applications.

A cloud computing system may be capable of providing VMs corresponding to different VM series. As used herein, the term "VM series" refers to a set of one or more VM sizes. The term "VM size" refers to a certain allocation of computing resources. For example, in some contexts, a VM size may include a combination of (i) some portion of a central processing unit, (ii) a certain amount of memory, and (iii) a certain amount of storage.

In a cloud computing system, the demand for computing resources can sometimes exceed the available supply. This can lead to allocation failures, in which users request computing resources but the system is unable to provide them. One way to mitigate allocation failures is to purchase additional computing resources for the cloud computing system. This, however, can lead to overprovisioning, in which there are too many computing resources available so that there is a lot of excess capacity. Overprovisioning is also undesirable, because it increases the cost of providing cloud computing services. Therefore, the administrators of a cloud computing system are faced with the difficult task of trying to ensure that there are sufficient computing resources to satisfy user demand without overprovisioning.

SUMMARY

A method for minimizing allocation failures in a cloud computing system without overprovisioning is disclosed. The method includes determining a predicted supply for a VM series in a system unit of the cloud computing system during an upcoming time period. As used herein, the term "system unit" refers to a part of the cloud computing system that is considered as a unit for purposes of determining capacity for allocating VMs corresponding to particular VM series. The predicted supply may be based at least in part on a shared available current capacity for the VM series in the system unit and shared available future added capacity for the VM series in the system unit. The method also includes predicting an available capacity for the VM series in the system unit during the upcoming time period. The predicted available capacity may be based at least in part on a predicted demand for the VM series in the system unit during the upcoming time period and the predicted supply for the VM series in the system unit during the upcoming time period. The method also includes taking at least one mitigation action in response to determining that the predicted demand exceeds the predicted supply during the upcoming time period.

Determining the shared available current capacity for the VM series in the system unit may be based at least in part on a current available capacity for the system unit and a demand growth ratio for the VM series in the system unit. Determining the shared available future added capacity for the VM series in the system unit may be based at least in part on a future added capacity for the system unit and the demand growth ratio for the VM series in the system unit.

In some embodiments, at least one mitigation action may be taken automatically in response to determining that the predicted demand exceeds the predicted supply during the upcoming time period.

The method may additionally include determining a plurality of predictions regarding the available capacity for the VM series in the system unit during the upcoming time period. The plurality of predictions regarding the available capacity may be based on a plurality of different demand predictions.

In some embodiments, the method may additionally include monitoring the predicted available capacity and providing an alert when the predicted available capacity changes from indicating a first type of prediction to indicating a second type of prediction. The method may also include performing root-cause analysis to determine why the predicted available capacity changed from indicating the first type of prediction to indicating the second type of prediction and providing a root-cause analysis report that describes what was determined during the root-cause analysis.

The method may additionally include monitoring the predicted demand, the current available capacity, and the future added capacity and providing an alert when a value of the predicted demand, the current available capacity, or the future added capacity changes by more than a predetermined amount within a predetermined time period.

In some embodiments, the method may additionally include performing root-cause analysis in response to detecting an anomaly and providing a root-cause analysis report that describes what was determined during the root-cause analysis.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

The present disclosure is generally related to ensuring that there are sufficient computing resources in a cloud computing system to satisfy user demand, while at the same time preventing overprovisioning which would lead to significant amounts of unused capacity. To achieve the proper balance between these competing goals, the present disclosure describes an intelligent capacity model that predicts the available capacity during an upcoming time period for a virtual machine (VM) series for a particular system unit. In general terms, the predicted available capacity represents the difference between the predicted demand for the VM series in the system unit during the upcoming time period and the predicted supply for the VM series in the system unit during the upcoming time period. If the predicted demand is predicted to exceed the predicted supply at any point during the upcoming time period, then one or more mitigation actions may be performed, such as purchasing additional computing resources.

The predicted supply may be based on both current available capacity and future added capacity. In this context, the term "current available capacity" refers to the computing resources that are currently available for allocating VMs of a particular VM series within a particular system unit. The term "future added capacity" refers to additional computing resources that are expected to become available at some point during the time period for which the predicted available capacity is determined and that may be used for allocating VMs of the particular VM series within the particular system unit.

Advantageously, the predicted supply may also take into consideration the fact that the servers within a cloud computing system are fungible with respect to VM series. In other words, the same servers may be used to host different VM series. When determining the predicted available capacity for a particular VM series, a determination may be made regarding how much of the current available capacity and the future added capacity within the system unit can be considered to be available to allocate VMs corresponding to that VM series in view of the fact that some of the current available capacity and the future added capacity will likely be used to allocate VMs corresponding to other VM series.

Figure 1:
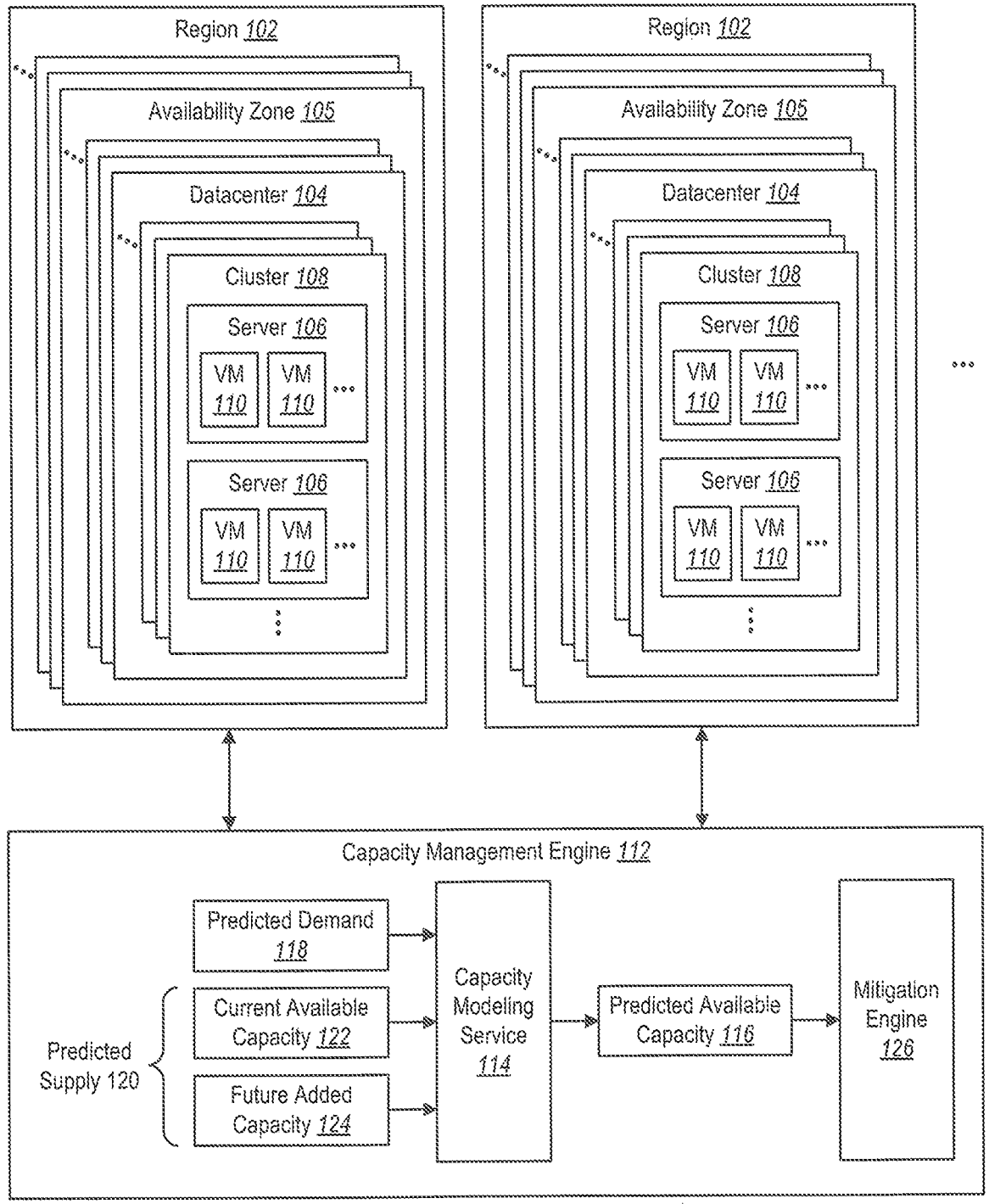
FIG. 1 illustrates some aspects of a cloud computing system that includes a capacity modeling service in accordance with the present disclosure.

FIG. 1 illustrates some aspects of a cloud computing system 100 in which aspects of the present disclosure may be implemented. The cloud computing system 100 provides computing resources to a plurality of regions 102 via the Internet. Each region 102 includes a plurality of availability zones 105. Availability zones 105 are distinct physical locations within a region 102. Each availability zone 105 includes one or more datacenters 104. Each datacenter 104 includes a plurality of servers 106, which may be organized logically into a plurality of clusters 108. Each server 106 may be configured to host a plurality of VMs 110. The physical separation of availability zones 105 within a region 102 protects applications and data from datacenter 104 failures.

When a user requests an allocation of VMs 110, the user may be able to request a particular region 102 in which the VMs 110 should be located. This is beneficial because the location of the VMs 110 can be important to users. For example, users may want the VMs 110 to be located in close proximity to where the users themselves (and/or their customers) are located, in order to minimize latency when using or otherwise interacting with the VMs 110.

As indicated above, the cloud computing system 100 may be capable of providing VMs 110 corresponding to different VM series. When a user requests an allocation of VMs 110, in addition to requesting a particular system unit (e.g., region 102) in which the VMs 110 should be located, the user may also specify a particular VM series for the allocation of VMs 110.

In addition to the servers 106 within the datacenters 104, there are a number of controllers and other components that are responsible for handling various aspects of the operation of the cloud computing system 100 (e.g., allocating VMs 110, performing software updates, tracking usage for billing purposes). In the depicted cloud computing system 100, one of these components is represented as a capacity management engine 112.

The capacity management engine 112 includes a capacity modeling service 114 that is configured to predict the available capacity 116 for the available VM series in various system units of the cloud computing system 100. As indicated above, the term "system unit" refers to a part of the cloud computing system 100 that is considered as a unit for purposes of determining capacity for allocating VMs 110 of particular VM series. For example, in some embodiments, a system unit may be a region 102 and/or an availability zone 105. In other words, system capacity may be modeled and predicted with respect to particular regions 102 of the cloud computing system 100 and/or with respect to particular availability zones 105.

In general terms, the predicted available capacity 116 for a particular VM series in a particular system unit (e.g., region 102, availability zone 105) during an upcoming time period is the difference between (a) a predicted demand 118 for the particular VM series in the particular system unit during the upcoming time period, and (b) a predicted supply 120 for the particular VM series in the particular system unit during the upcoming time period. The predicted supply 120 may be based on both current available capacity 122 and future added capacity 124. As indicated above, the predicted supply 120 may take into consideration the fact that the servers 106 within a cloud computing system 100 may be used to host VMs 110 corresponding to different VM series. This will be discussed in greater detail below.

The capacity modeling service 114 may be integrated with a mitigation engine 126. When the predicted demand 118 for a particular VM series in a particular system unit is predicted to exceed the predicted supply 120 for that VM series in that system unit, this information may be provided to the mitigation engine 126, which may take one or more mitigation actions in response. There are many different types of mitigation actions that could be taken in accordance with the present disclosure. For example, additional computing resources could be purchased. Another example of a mitigation action is enforcing offer restrictions. In other words, one or more VM series may be temporarily discontinued in a system unit, at least with respect to new subscriptions, until there is sufficient capacity for the VM series in that system unit. Some other examples include attempting to recover unhealthy servers 106, migrating lower priority workloads to other system units, and evicting lower priority workloads from the cloud computing system 100.

The mitigation engine 126 may take one or more mitigation actions in response to detecting that the predicted demand 118 for a particular VM series in a particular system unit exceeds the predicted supply 120 for that VM series in that system unit. In some embodiments, such mitigation actions may be taken automatically. In other words, once the mitigation engine 126 detects that the predicted demand 118 exceeds the predicted supply 120, the mitigation engine 126 may take one or more mitigation actions without additional human involvement. Alternatively, at least some mitigation actions may be taken manually (e.g., with at least minimal human involvement) by one or more individuals who have responsibility for ensuring that the system unit of the cloud computing system 100 has sufficient capacity to satisfy customer demand.

As indicated above, the servers 106 within a cloud computing system 100 are fungible with respect to VM series, such that the same servers 106 may be used to host VMs 110 corresponding to different VM series. This presents a modeling challenge about how to split the available computing resources among various VM series that are competing to consume the available pool of computing resources.

To address this challenge, the present disclosure proposes estimating what will be referred to as the "shared available current capacity" and the "shared available future added capacity." The shared available current capacity for a particular VM series in a particular system unit indicates how much of the current available capacity 122 within the system unit can be considered to be available to allocate VMs 110 corresponding to that VM series in view of the fact that some of the current available capacity 122 within the system unit is likely to be used to allocate VMs 110 corresponding to other VM series. Similarly, the shared available future added capacity for a particular VM series in a particular system unit indicates how much of the future added capacity 124 for the system unit can be considered to be available to allocate VMs 110 corresponding to that VM series in view of the fact that some of the future added capacity 124 for the system unit is likely to be used to allocate VMs 110 corresponding to other VM series.

Figure 2:
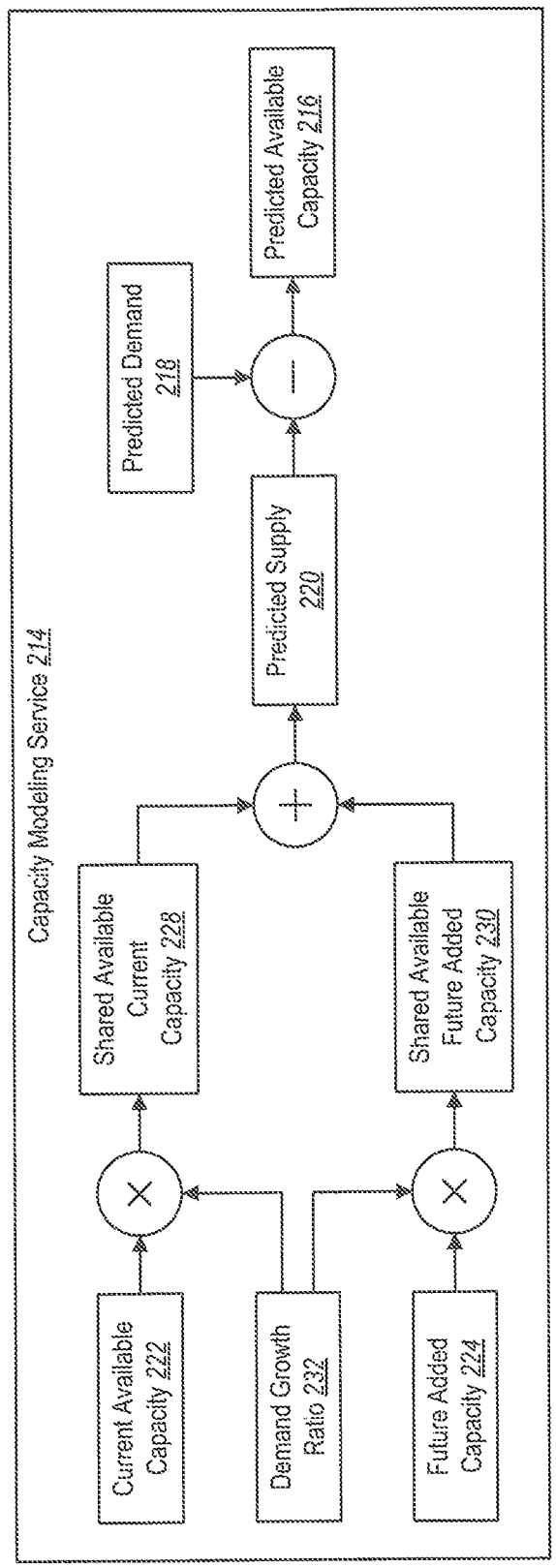
FIG. 2 illustrates an example showing how a capacity modeling service may determine predicted available capacity using shared available current capacity and shared available future added capacity.

FIG. 2 illustrates an example showing how the predicted available capacity 216 may be determined by a capacity modeling service 214 that estimates shared available current capacity 228 and shared available future added capacity 230. The capacity modeling service 214 that is shown in FIG. 2 is one possible implementation of the capacity modeling service 214 in the system 100 shown in FIG. 1.

To determine the shared available current capacity 228 for a particular VM series in a particular system unit, the current available capacity 222 for that VM series in that system unit may be multiplied by the demand growth ratio 232 for that VM series in that system unit. Similarly, to determine the shared available future added capacity 230 for a particular VM series in a particular system unit, the future added capacity 224 for that VM series in that system unit may be multiplied by the demand growth ratio 232 for that VM series in that system unit. In general terms, the demand growth ratio 232 for a particular VM series in a particular system unit indicates how quickly demand for that VM series is expected to grow in that system unit relative to how quickly demand for all available VM series is expected to grow in that system unit. Some examples showing how the demand growth ratio 232 may be calculated will be discussed below.

The predicted supply 220 may be determined by adding together the shared available current capacity 228 and the shared available future added capacity 230. The predicted available capacity 216 may then be determined by taking the difference between the predicted demand 218 and the predicted supply 220.

There are several different ways that the current available capacity 222 and the future added capacity 224 for a particular VM series may be represented. In some embodiments, these metrics may be represented in terms of the number of virtual central processing units (CPUs) that can be allocated. For example, the current available capacity 222 for a particular VM series in a particular system unit may indicate how many virtual CPUs corresponding to that VM series could be allocated if all of the current available capacity 222 in that system unit were dedicated to allocating VMs 110 corresponding to that VM series. Similarly, the future added capacity 224 for a particular VM series in a particular system unit may indicate how many virtual CPUs corresponding to that VM series could be allocated if all of the future added capacity 224 in that system unit were dedicated to allocating VMs 110 corresponding to that VM series.

In embodiments where the current available capacity 222 for a particular VM series in a particular system unit is represented in terms of the number of virtual CPUs that could be allocated, the shared available current capacity 228 may also be represented in terms of the number of virtual CPUs that could be allocated. This is because the shared available current capacity 228 may represent the current available capacity 222 multiplied by the demand growth ratio 232 (as discussed above). Similarly, in embodiments where the future added capacity 224 for a particular VM series in a particular system unit is represented in terms of the number of virtual CPUs that could be allocated, the shared available future added capacity 230 may also be represented in terms of the number of virtual CPUs that could be allocated, because the shared available future added capacity 230 may represent the future added capacity 224 multiplied by the demand growth ratio 232 (as also discussed above).

An example will now be discussed showing how the shared available current capacity 228 and the shared available future added capacity 230 may be calculated. In this example, it will be assumed that the current available capacity 222, the shared available current capacity 228, the future added capacity 224, and the shared available future added capacity 230 are represented in terms of the number of virtual CPUs that could be allocated. It will also be assumed that there are only two available VM series, VM1 and VM2, that can coexist within the same system unit. In other words, it will be assumed that the servers 106 within a particular system unit can simultaneously host some VMs 110 corresponding to VM series VM1 and other VMs 110 corresponding to VM series VM2. VM1 represents some combination of physical CPU, memory, and storage, and VM2 represents another different combination of physical CPU, memory, and storage. There may, of course, be many more than two VM series available within a cloud computing system 100, but for the sake of simplicity only two VM series will be discussed in connection with the present example.

In this example, it will also be assumed that the current available capacity 222 for VMs 110 corresponding to VM series VM1 is represented by $Q1_{current}$, and the current available capacity 222 for VMs 110 corresponding to VM series VM2 is represented by $Q2_{current}$. In other words, if all of the current available capacity 222 were used for allocating VMs 110 corresponding to VM series VM1, then $Q1_{current}$ virtual CPUs corresponding to VM series VM1 could be allocated. Alternatively, if all of the current available capacity 222 were used for allocating VMs 110 corresponding to VM series VM2, then $Q2_{current}$ virtual CPUs corresponding to VM series VM2 could be allocated. That is, either $Q1_{current}$ virtual CPUs corresponding to VM series VM1 could be allocated or $Q2_{current}$ virtual CPUs corresponding to VM series VM2 could be allocated, but not both.

It will also be assumed that the demand growth ratio 232 for VMs 110 corresponding to VM series VM1 is represented by X1, and the demand growth ratio 232 for VMs 110 corresponding to VM series VM2 is represented by X2. With these assumptions, the shared available current capacity 228 for VMs 110 corresponding to VM series VM1 may be represented as $$Q1_{current} \frac{X1}{(X1+X2)}.$$

Similarly, the shared available current capacity 228 for VMs 110 corresponding to VM series VM2 may be represented as $$Q2_{current} \frac{X1}{(X1+X2)}.$$

Continuing with the example, suppose that the future added capacity 224 for VMs 110 corresponding to VM series VM1 is represented by $Q1_{future}$, and the future added capacity 224 for VMs 110 corresponding to VM series VM2 is represented by $Q2_{future}$. In other words, if all of the future added capacity 224 were used for allocating VMs 110 corresponding to VM series VM1, then $Q1_{future}$ virtual CPUs corresponding to VM series VM1 could be allocated. Alternatively, if all of the future added capacity 224 were used for allocating VMs 110 corresponding to VM series VM2, then $Q2_{future}$ virtual CPUs corresponding to VM series VM2 could be allocated. With these assumptions, the shared available future added capacity 230 for VMs 110 corresponding to VM series VM1 may be represented as $$Q1_{future} \frac{X1}{(X1+X2)}.$$

Similarly, the shared available future added capacity 230 for VMs 110 corresponding to VM series VM2 may be represented as $$Q2_{future} \frac{X1}{(X1+X2)}.$$

In the example just described, the current available capacity 222, the shared available current capacity 228, the future added capacity 224, and the shared available future added capacity 230 were represented in terms of the number of virtual CPUs that could be allocated. In alternative embodiments, these metrics may instead be represented in terms of the number of VMs 110 that could be allocated.

For example, in some embodiments, the current available capacity 222 for a particular VM series in a particular system unit may indicate how many VMs 110 corresponding to that VM series could be allocated if all of the current available capacity 222 within the system unit were dedicated to allocating VMs 110 corresponding to that VM series. This is different from representing the current available capacity 222 in terms of the number of virtual CPUs that could be allocated, because in some situations a single VM may include a plurality of virtual CPUs (depending on the VM series). Similarly, the future added capacity 224 for a particular VM series in a particular system unit may indicate how many VMs 110 corresponding to that VM series could be allocated if all of the future added capacity 224 within the system unit were dedicated to allocating VMs 110 corresponding to that VM series.

In embodiments where the current available capacity 222 for a particular VM series is represented in terms of the number of VMs 110 that could be allocated, the shared available current capacity 228 may also be represented in terms of the number of VMs 110 that could be allocated, because the shared available current capacity 228 may simply represent the current available capacity 222 multiplied by the demand growth ratio 232 (as discussed above). Similarly, in embodiments where the future added capacity 224 for a particular VM series is represented in terms of the number of VMs 110 that could be allocated, the shared available future added capacity 230 may also be represented in terms of the number of VMs 110 that could be allocated, because the shared available future added capacity 230 may simply represent the future added capacity 224 multiplied by the demand growth ratio 232 (as also discussed above).

Figures 3A, 3B:
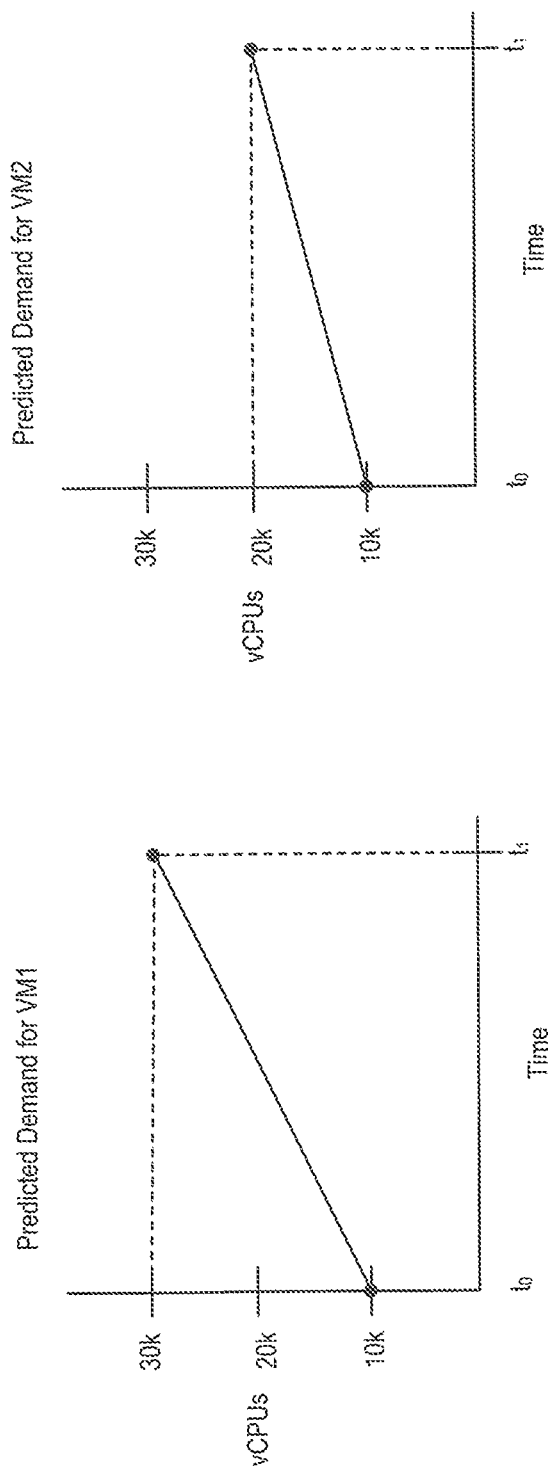
FIGS. 3A and 3B illustrate an example showing how a demand growth ratio may be calculated for a particular VM series in a particular system unit.

FIGS. 3A and 3B illustrate an example showing how the demand growth ratio 232 may be calculated for a particular VM series in a particular system unit. As with the previous example, for the sake of simplicity it will be assumed that there are only two VM series available in the system unit, VM1 and VM2. FIG. 3A illustrates the predicted demand 218 for VM series VM1 during an upcoming time period. FIG. 3B illustrates the predicted demand 218 for VM series VM2 during the upcoming time period.

In the depicted example, the predicted demand 218 is represented in terms of virtual CPUs corresponding to allocated VMs 110. However, in alternative embodiments, the predicted demand 218 may be represented in terms of a different capacity metric, such as the number of VMs 110 that have been allocated.

Referring initially to FIG. 3A, at time $t_0$ (which in this example represents the current point in time) the demand for VMs 110 corresponding to VM series VM1 is 10,000 vCPUs. In other words, 10,000 vCPUs corresponding to VMs 110 corresponding to VM series VM1 have been allocated. At time $t_1$ (which represents some future point in time) the demand for VMs 110 corresponding to VM series VM1 is predicted to be 30,000 vCPUs. In other words, it is predicted that at time $t_1$, 30,000 vCPUs will have been allocated corresponding to VMs 110 corresponding to VM series VM1. Thus, the demand for VMs 110 corresponding to VM series VM1 is predicted to increase by 20,000 vCPUs during an upcoming time period between time $t_0$ and time $t_1$.

Referring now to FIG. 3B, at time $t_0$ the demand for VMs 110 corresponding to VM series VM2 is also 10,000 vCPUs. At time $t_1$, however, the demand for VMs 110 corresponding to VM series VM2 is only predicted to be 20,000 vCPUs. Thus, the demand for VMs 110 corresponding to VM series VM2 is predicted to increase by only 10,000 vCPUs between time $t_0$ and time $t_1$.

As indicated above, the demand growth ratio 232 for a particular VM series in a particular system unit indicates how quickly demand for that VM series is expected to grow in that system unit relative to how quickly demand for all available VM series is expected to grow in that system unit. The demand growth ratio 232 for VM series i in a particular system unit may be expressed mathematically as $$\frac{Growth_i}{\sum_{j=1}^{N} Growth_j}.$$

In this expression, $Growth_i$ represents the predicted growth in the demand for VM series i. The expression $\sum_{j=1}^{N} Growth_j$ represents the sum of the predicted growth in the demand for all of the available VM series in the system unit, where there are N available VM series and j is an index. Thus, with respect to the specific example shown in FIGS. 3A-B, the demand growth ratio 232 for VM series VM1 may be expressed as $$\frac{20,000}{20,000 + 10,000} = \frac{2}{3}.$$

The demand growth ratio 232 for VM series VM2 may be expressed as $$\frac{10,000}{20,000 + 10,000} = \frac{1}{3}.$$

Thus, ⅔ of the current available capacity 222 and the future added capacity 224 within the system unit can be considered to be available to allocate VMs 110 corresponding to VM series VM1, and ⅓ of the current available capacity 222 and the future added capacity 224 within the system unit can be considered to be available to allocate VMs 110 corresponding to VM series VM2.

Of course, the example shown in FIGS. 3A-B is highly simplified for the sake of clarity. In the depicted example, the predicted demand 218 for VM series VM1 and VM series VM2 is shown as increasing linearly between time $t_0$ and time $t_1$. In actual practice, however, the predicted demand 218 for a particular VM series may be substantially nonlinear.

Those skilled in the art will appreciate that a wide variety of forecasting models may be used to provide the predicted demand 218 as described herein, and the scope of the present disclosure should not be limited to any specific forecasting model.

Figure 4:
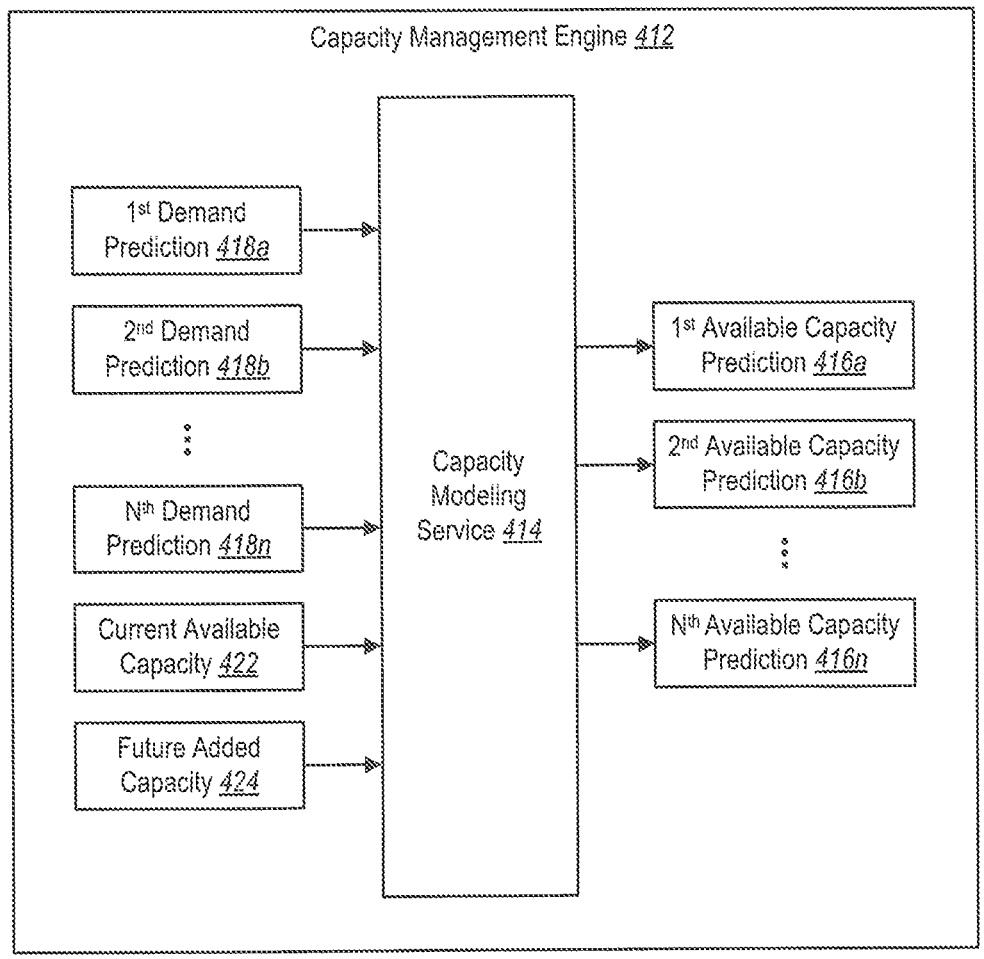
FIG. 4 illustrates a capacity modeling service that is configured to generate a plurality of predictions for the same VM series in the same system unit.

Referring now to FIG. 4, in some embodiments a plurality of predictions may be generated for the same VM series in the same system unit. In particular, FIG. 4 shows a plurality of demand predictions (specifically, a first demand prediction 418a, a second demand prediction 418b, and an Nth demand prediction 418n) being provided as input to a capacity modeling service 414, along with information about the current available capacity 422 and the future added capacity 424. The capacity modeling service 414 may use the plurality of demand predictions 418a-n, the current available capacity 422, and the future added capacity 424 to make a plurality of predictions regarding the available capacity for the VM series in that system unit. FIG. 4 shows the capacity modeling service 414 producing a first available capacity prediction 416a corresponding to the first demand prediction 418a, a second available capacity prediction 416b corresponding to the second demand prediction 418b, and an Nth available capacity prediction 416n corresponding to the Nth demand prediction 418n.

The different demand predictions 418a-n may correspond to different degrees of uncertainty regarding the predicted demand for the VM series in the system unit. In some embodiments, different demand predictions 418a-n may correspond to different percentile levels. For example, the first demand prediction 418a may represent percentile level x (meaning that there is an x % probability that the actual demand will be less than what is predicted), the second demand prediction 418b may represent percentile level y, and the Nth demand prediction 418n may represent percentile level z.

In some embodiments, the different demand predictions 418a-n may correspond to different "what if" scenarios. For example, under some circumstances, certain features or settings associated with the cloud computing system 100 can be changed in particular ways to affect the demand for different VM series. The different demand predictions 418a-n may correspond to different scenarios representing different sets of these features and/or settings, and the different available capacity predictions 416a-n may correspond to the different scenarios represented by the different demand predictions 418a-n.

In embodiments where a plurality of available capacity predictions 416a-n are produced, one or more of the available capacity predictions 416a-n may indicate that there is sufficient capacity to satisfy user demand (in other words, that the predicted supply 120 exceeds the predicted demand 118 throughout the time period under consideration), while one or more of the available capacity predictions 416a-n may indicate that there is insufficient capacity to satisfy user demand (in other words, that the predicted demand 118 exceeds the predicted supply 120 during at least part of the time period under consideration). In this situation, the mitigation engine 126 may decide whether or not to take any mitigation actions. This decision may be based at least in part on one or more settings within the capacity management engine 112.

For example, suppose that two demand predictions are generated: a first demand prediction representing the 50th percentile level, and a second demand prediction representing the 90th percentile level. Two available capacity predictions may be produced: a first available capacity prediction corresponding to the 50th percentile level demand prediction (the P50 prediction), and a second available capacity prediction corresponding to the 90th percentile level demand prediction (the P90 prediction). Further suppose that the P50 prediction indicates that there is sufficient capacity to satisfy user demand, but the P90 prediction indicates that there is insufficient capacity to satisfy user demand. In this situation, the mitigation engine 126 may decide whether or not to take any mitigation actions based at least in part on one or more settings within the capacity management engine 112 that indicate whether the P50 prediction or the P90 prediction should be followed. If the setting(s) indicate that the P50 prediction should be followed, then the mitigation engine 126 may refrain from taking any mitigation actions. If, however, the setting(s) indicate that the P90 prediction should be followed, then the mitigation engine 126 may take one or more mitigation actions.

Figure 5:
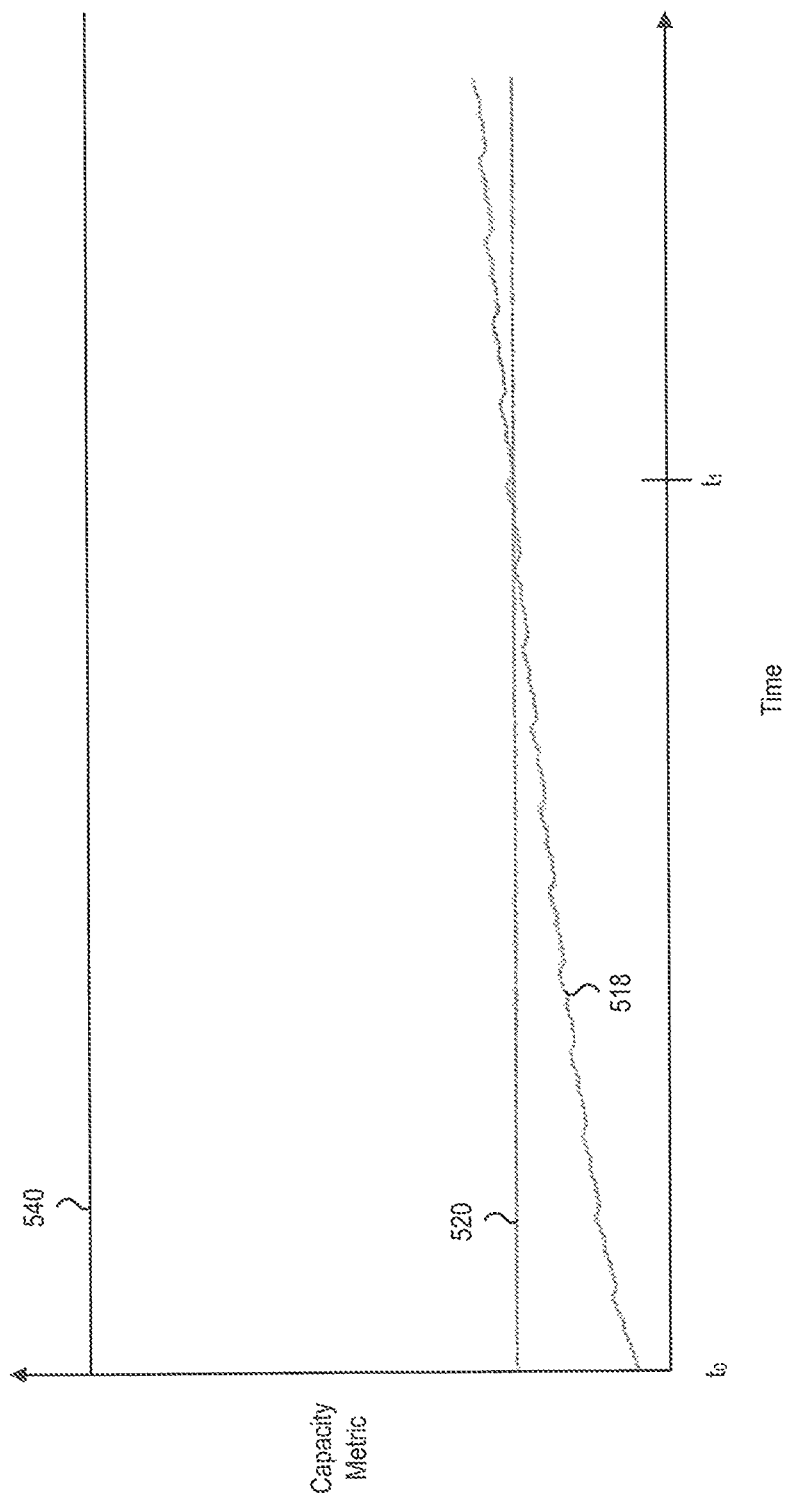
FIG. 5 illustrates an example showing a comparison of the predicted demand and the predicted supply for a particular VM series in a particular system unit during a particular time period.

FIG. 5 is a graph that illustrates an example showing a comparison of the predicted demand 518 and the predicted supply 520 for a particular VM series in a particular system unit during a particular time period. The x-axis of the graph represents time, and the y-axis of the graph represents some metric that indicates capacity. For example, the capacity metric may be the number of virtual CPUs that could be allocated for the particular VM series, the number of VMs 110 that could be allocated for the particular VM series, or the like.

In this example, it is assumed that the future added capacity 224 is zero. In other words, in this example, no additional computing resources are expected to become available at any point during the time period for which the predicted available capacity 116 is determined. Therefore, the predicted supply 520 does not change during this time period, and it is equal to the shared available current capacity 228. The other line 540 that is shown in the graph represents the sum of the current available capacity 222 and the future added capacity 224. Because the future added capacity 224 is zero, this line 540 corresponds to the current available capacity 222 in this example. In other words, this line 540 (which is shown for illustrative purposes only) represents the raw (unshared) capacity, and it may be used to compute the shared available current capacity 228.

The predicted supply 520 exceeds the predicted demand 518 between time $t_0$ and time $t_1$. Therefore, it is predicted that there will be sufficient capacity to handle user demand between time $t_0$ and time $t_1$. After time $t_1$ however, the predicted demand 518 exceeds the predicted supply 520, so it is predicted that there will not be sufficient capacity to handle user demand after time $t_1$. Accordingly, it may be beneficial to take one or more mitigation actions prior to time $t_1$ (the point where the predicted demand 518 starts exceeding the predicted supply 520) so that allocation failures do not occur.

If the predicted available capacity 116 is represented as the difference between the predicted supply 520 and the predicted demand 518, then the predicted available capacity 116 would be represented as a positive value between time $t_0$ and time $t_1$. Following time $t_1$, however, the predicted available capacity 116 would be represented as a negative value.

Figure 6:
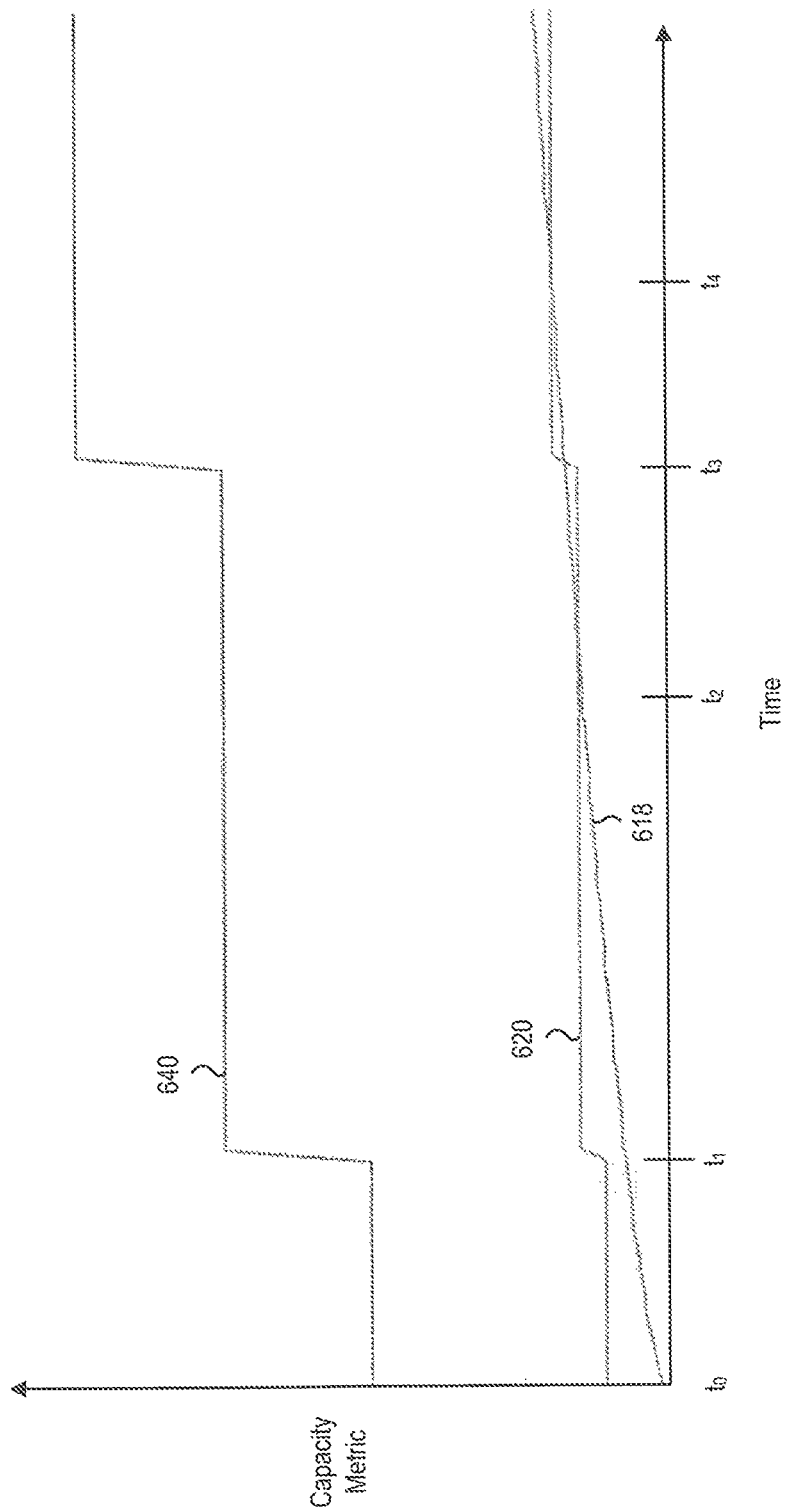
FIG. 6 illustrates another example that compares the predicted demand and the predicted supply, in which the future added capacity is not zero.

FIG. 6 is a graph that illustrates another example showing a comparison of the predicted demand 618 and the predicted supply 620 for a particular VM series in a particular system unit during a particular time period. In this example, additional computing resources are added to the system unit on two separate occasions (time $t_1$ and time $t_3$) during the time period for which the predicted available capacity 116 is determined. Therefore, the future added capacity 224 is non-zero. This is reflected in the other line 640 that is shown in the graph, which represents the sum of the current available capacity 222 and the future added capacity 224. In other words, this line 640 may be considered to represent the total capacity in the system unit. This line 640 increases in value when additional computing resources are added to the system unit at time $t_1$ and time $t_3$.

The addition of computing resources results in an increase to the total capacity represented by the line 640 as well as the predicted supply 620. The increases to the predicted supply 620 are not as large as the increases to the total capacity represented by the line 640 because, as indicated above, some of the additional computing resources are likely to be used to allocate VMs 110 corresponding to other VM series.

The predicted supply 620 exceeds the predicted demand 618 between time $t_0$ and time $t_2$, so it is predicted that there will be sufficient capacity to handle user demand during this time. After time $t_2$, however, the predicted demand 618 increases above the predicted supply 620, so it is predicted that there will not be sufficient capacity to handle user demand between time $t_2$ and time $t_3$. Because of the additional computing resources that are added at time $t_3$, however, the predicted supply 620 once again exceeds the predicted demand 618 between time $t_3$ and time $t_4$. After time $t_4$, however, the predicted demand 618 once again exceeds the predicted supply 620.

As can be inferred from the graph shown in FIG. 6, in some embodiments the predicted demand 618 and the predicted supply 620 may each be represented as a time series. Accordingly, the predicted available capacity 116 may also be represented as a time series.

In addition, the future added capacity 224 and the shared available future added capacity 230 may also each be represented as a time series. These time series may include non-zero values at the points in time when additional computing resources are being added to the system unit (e.g., at times $t_1$ and $t_3$ in the example shown in FIG. 6) and values of zero otherwise.

Figure 7:
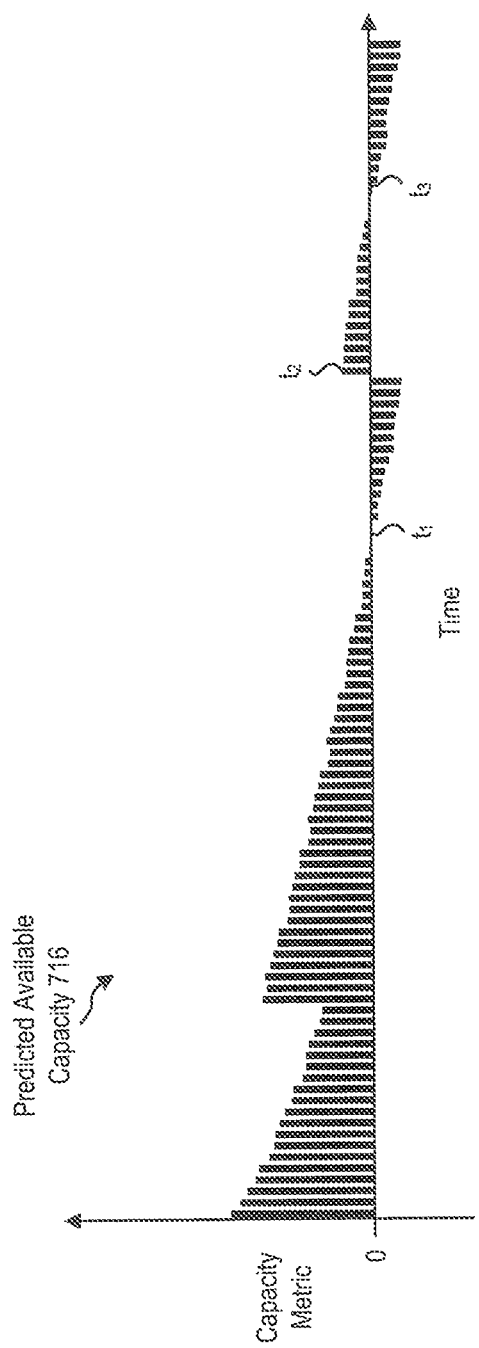
FIG. 7 shows a time series that represents the predicted available capacity for a particular VM series in a particular system unit during a particular time period.

FIG. 7 is a graph that shows a time series that represents the predicted available capacity 716 for a particular VM series in a particular system unit during a particular time period. In the depicted example, each value in the time series represents the predicted available capacity 716 during a particular time interval (e.g., day, hour, week).

In the depicted example, a positive value corresponding to a particular time interval indicates that the predicted supply 120 exceeds the predicted demand 118 during that time interval, meaning that the system unit is not predicted to run out of capacity for that VM series during that time interval. Conversely, a negative value corresponding to a particular time interval indicates that the predicted demand 118 exceeds the predicted supply 120 during that time interval, meaning that the system unit is predicted to run out of capacity for that VM series during that time interval.

The graph shows that the predicted available capacity 716 remains positive (meaning that the system unit is not predicted to run out of capacity for the particular VM series) until time interval $t_1$. At time interval $t_1$, the predicted available capacity 716 turns negative (meaning that the system unit is predicted to run out of capacity for the particular VM series). The predicted available capacity 716 remains negative until time interval $t_2$, when the predicted available capacity 716 turns positive again. This may be due to additional computing resources being added to the system unit and/or to a decrease in the predicted demand 118. The predicted available capacity 716 remains positive until time interval $t_3$, when the predicted available capacity 716 turns negative again. The predicted available capacity 716 remains negative after time interval $t_3$.

In some embodiments, a time series (such as the time series shown in FIG. 7) may be provided to a mitigation engine 126. In response, the mitigation engine 126 may take one or more mitigation actions prior to time $t_1$ (the point where the predicted available capacity 716 becomes negative) so that allocation failures do not occur.

Figure 8:
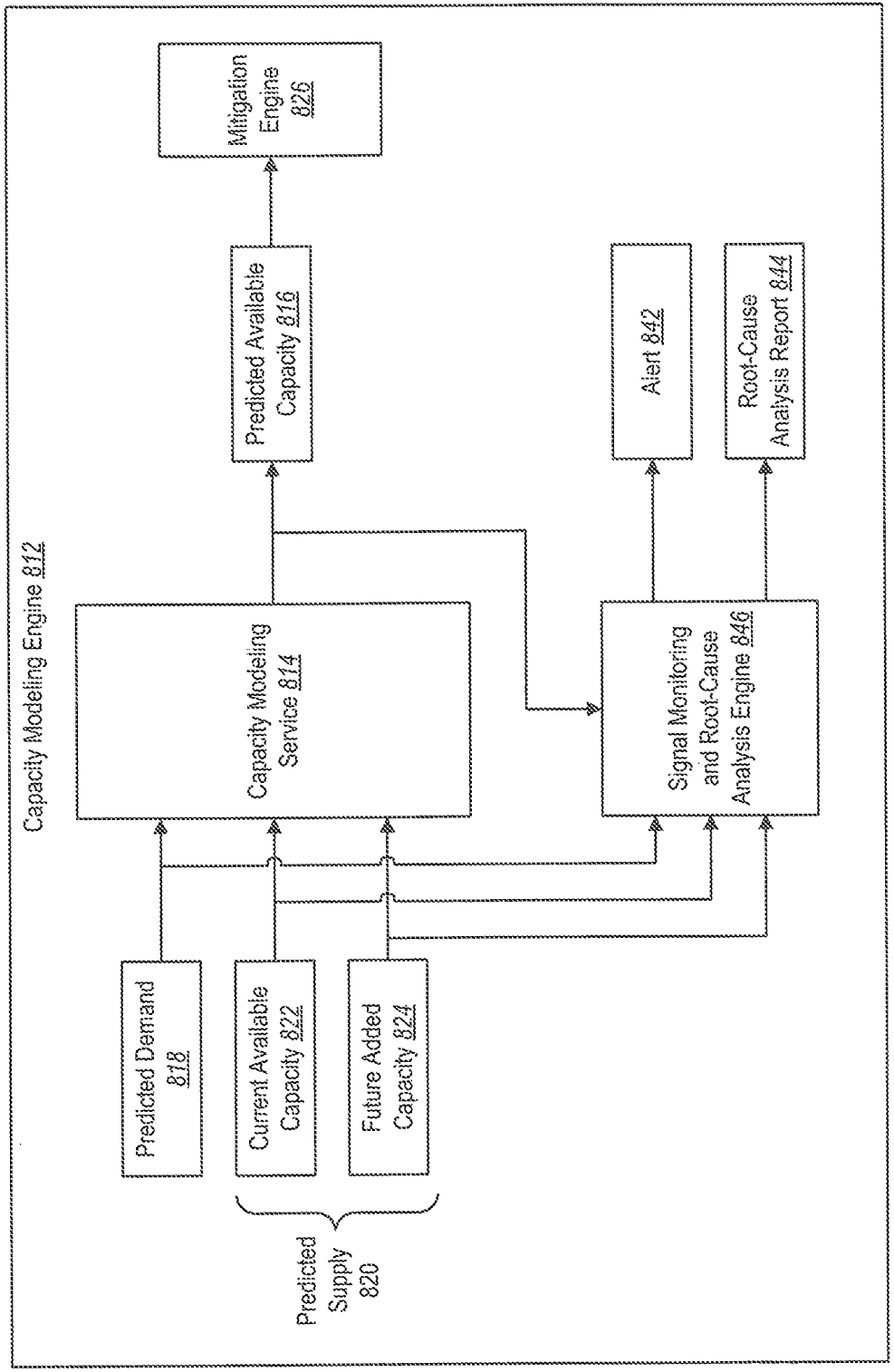
FIG. 8 illustrates a capacity management engine that is configured to monitor the predicted available capacity and provide relevant alerts.

Referring now to FIG. 8, another aspect of the present disclosure is related to monitoring the predicted available capacity 816 and providing alerts related to changes to the predicted available capacity 816. In the capacity management engine 812 shown in FIG. 8, the capacity modeling service 814 determines the predicted available capacity 816 for a particular VM series in a particular system unit. The determination of the predicted available capacity 816 may be based on the predicted demand 818 and the predicted supply 820 (as determined from the current available capacity 822 and the future added capacity 824) for that VM series in that particular system unit, as described above. When determining the predicted supply 820, consideration may also be given to the fact that the same servers 106 may be used to host different VM series, as also described above.

In the depicted capacity management engine 812, the predicted available capacity 816 that is output by the capacity modeling service 814 may be monitored. As indicated above, the predicted available capacity 816 for a particular VM series in a particular system unit during an upcoming time period may include a set of values (e.g., a time series of values). Two possible predictions may be inferred from this set of values: a positive prediction (meaning that the system unit is not predicted to run out of capacity for that VM series during the upcoming time period) or a negative prediction (meaning that the system unit is predicted to run out of capacity for that VM series at some point during the upcoming time period).

In some embodiments, an alert 842 may be provided whenever the predicted available capacity 816 for a particular VM series in a particular system unit changes from indicating a positive prediction to indicating a negative prediction. Alternatively, in other embodiments, an alert 842 may be provided when the predicted available capacity 816 for a particular VM series in a particular system unit changes from indicating a positive prediction to indicating a negative prediction after having indicated a positive prediction for a predetermined time period. For example, suppose that the predetermined time period is N consecutive days. If the predicted available capacity 816 for a particular VM series in a particular system unit indicates a positive prediction for N consecutive days, then in this example an alert 842 may be sent when the predicted available capacity 816 changes to indicate a negative prediction. However, if the predicted available capacity 816 for a particular VM series in a particular system unit indicates a positive prediction for only M consecutive days (where M<N) before changing to indicate a negative prediction, then in the present example an alert 842 may not necessarily be sent in that situation.

When an alert 842 is provided, the alert 842 may be sent to one or more individuals who have responsibility for ensuring that the system unit of the cloud computing system 100 has sufficient capacity to satisfy customer demand. If the alert 842 has changed from indicating a positive prediction to indicating a negative prediction, the individual(s) who receive the alert 842 may take one or more mitigation actions (possibly in connection with the mitigation engine 826) to prevent allocation failures from occurring.

In some embodiments, an alert 842 may also be provided whenever the predicted available capacity 816 for a particular VM series in a particular system unit changes from indicating a negative prediction to indicating a positive prediction. It may be beneficial to provide an alert 842 in this situation so that the responsible individuals (e.g., individuals who have responsibility for ensuring that the system unit of the cloud computing system 100 has sufficient capacity to satisfy customer demand) can take steps to ensure that the change is accurate (e.g., that the change is not due to a data quality issue).

More generally, an alert 842 may be provided whenever the predicted available capacity 816 for a particular VM series in a particular system unit changes from indicating a first type of prediction (e.g., a positive prediction or a negative prediction) to indicating a second type of prediction (e.g., a negative prediction or a positive prediction).

In addition to providing an alert 842, root-cause analysis may also be performed to determine the reason(s) why the change occurred. A root-cause analysis (RCA) report 844 may also be prepared to describe what was determined during the root-cause analysis. The RCA report 844 may describe the cause of the change to the predicted available capacity 816, as determined by the root-cause analysis. In some embodiments, the cause of the change to the predicted available capacity 816 may be described in terms of changes to the inputs to the capacity management engine 812 (e.g., the predicted demand 818, the current available capacity 822, and/or the future added capacity 824). For example, if the root-cause analysis finds that the change to the predicted available capacity 816 was caused by a sudden increase to the predicted demand 818, this finding may be included in the RCA report 844.

In some embodiments, in addition to monitoring the predicted available capacity 816, the signals that are provided as input to the capacity management engine 812 (namely, the predicted demand 818, the current available capacity 822, and the future added capacity 824 in the depicted example) may also be monitored for anomalies, which may be indicated by sudden fluctuations in the input signals. When an anomaly is detected (e.g., the value of an input signal changes by more than a predetermined amount within a predetermined time period), then an alert 842 may be provided. The alert 842 may be sent to one or more individuals who have responsibility for aspects of the cloud computing system 100 that are related to the affected input signal. For example, if the value of the predicted demand 818 changes by more than a predetermined amount within a predetermined time period, then an alert 842 may be provided to one or more individuals who are responsible for determining the predicted demand 818.

In addition to providing an alert 842 when an anomaly (e.g., a sudden fluctuation to an input signal) is detected, root-cause analysis may also be performed to determine the reason(s) why the anomaly occurred. An RCA report 844 may also be prepared to describe what was determined during the root-cause analysis.

Under some circumstances, sudden fluctuations in input signals may be caused by problems with the cloud computing system 100 itself. In other situations, however, sudden fluctuations in input signals may be caused by something else, such as data quality issues. For example, suppose that the input signal representing the current available capacity 822 suddenly drops. This could be caused by an actual problem with the cloud computing system 100 itself, such as the failure of a large number of servers 106. Alternatively, the sudden fluctuation of the input signal representing the current available capacity 822 could be caused by a data quality issue, such as an error in the way that the current available capacity 822 is measured and/or reported.

In some embodiments, the root-cause analysis that is performed with respect to a sudden fluctuation in an input signal may determine whether that sudden fluctuation was caused by an actual problem with the cloud computing system 100 itself or by something else, such as a data quality issue. For instance, continuing with the example discussed previously, if the root-cause analysis determines that the sudden fluctuation of the input signal representing the current available capacity 822 was caused by the failure of a large number of servers 106, an RCA report 844 may be prepared that identifies the failure of a large number of servers 106 as the reason why this sudden fluctuation occurred. The RCA report 844 may then be sent to someone who is responsible for maintaining the servers 106 in proper working order and/or to someone who is responsible for purchasing additional servers 106. Alternatively, if the root-cause analysis determines that the sudden fluctuation of the input signal representing the current available capacity 822 was caused by a data quality issue, an RCA report 844 may be prepared that identifies the data quality issue as the reason why this sudden fluctuation occurred. In this case, the RCA report 844 may be sent to someone who is responsible for measuring and/or reporting the current available capacity 822.

The capacity management engine 812 shown in FIG. 8 includes a signal monitoring and root-cause analysis (RCA) engine 846. The signal monitoring and RCA engine 846 may be configured to provide the signal monitoring and root-cause analysis functionality described above.

Figure 9:
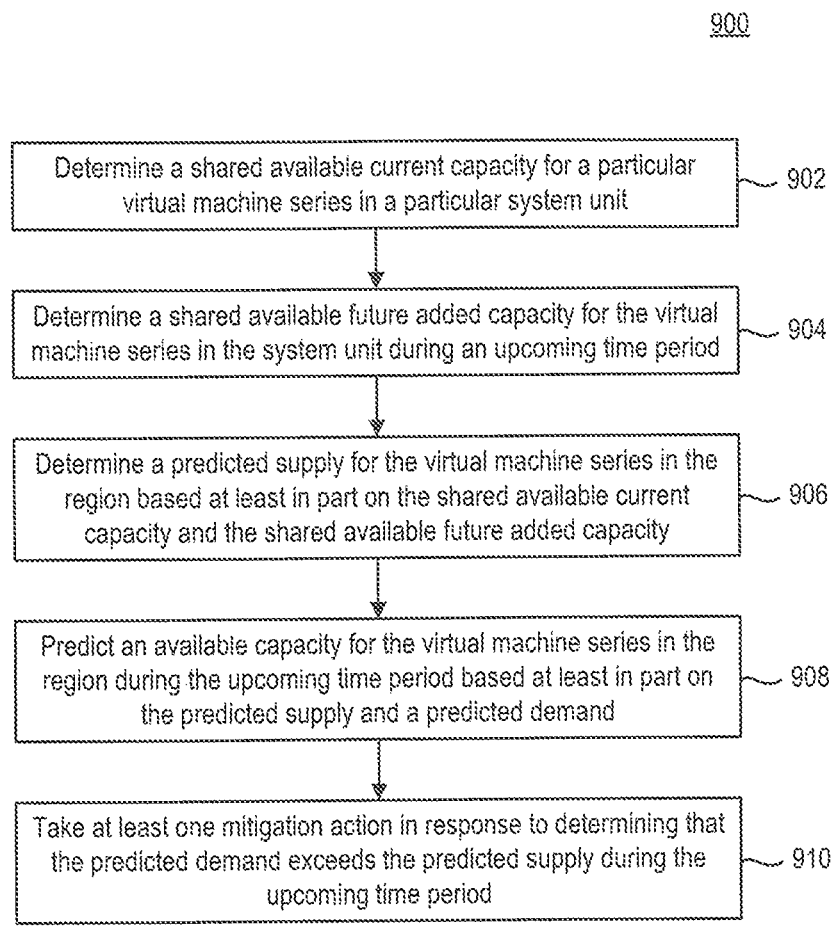
FIG. 9 illustrates a method for minimizing allocation failures in a cloud computing system without overprovisioning.

FIG. 9 illustrates a method 900 for minimizing allocation failures in a cloud computing system 100 without overprovisioning. For the sake of clarity, the method 900 will be described in relation to the systems, components, and data described previously.

Step 902 involves determining a shared available current capacity 228 for a particular VM series in a particular system unit. As indicated above, the shared available current capacity 228 for a particular VM series in a particular system unit indicates how much of the current available capacity 222 within the system unit can be considered to be available to allocate VMs 110 corresponding to that VM series in view of the fact that some of the current available capacity 222 within the system unit is likely to be used to allocate VMs 110 corresponding to other VM series. The shared available current capacity 228 for a particular VM series in a particular system unit may be based at least in part on the current available capacity 222 for that VM series in that system unit and the demand growth ratio 232 for that VM series in that system unit. For example, the current available capacity 222 may be multiplied by the demand growth ratio 232 to determine the shared available current capacity 228.

Step 904 involves determining a shared available future added capacity 230 for the VM series in the system unit during an upcoming time period. As indicated above, the shared available future added capacity 230 for a particular VM series in a particular system unit indicates how much of the future added capacity 224 for the system unit can be considered to be available to allocate VMs 110 corresponding to that VM series in view of the fact that some of the future added capacity 224 for the system unit is likely to be used to allocate VMs 110 corresponding to other VM series. The shared available future added capacity 230 for a particular VM series in a particular system unit may be based at least in part on the future added capacity 224 for that VM series in that system unit and the demand growth ratio 232 for that VM series in that system unit. For example, the future added capacity 224 may be multiplied by the demand growth ratio 232 to determine the shared available future added capacity 230.

Step 906 involves determining a predicted supply 220 for the VM series in the system unit based at least in part on the shared available current capacity 228 and the shared available future added capacity 230. For example, the shared available current capacity 228 and the shared available future added capacity 230 may be added together to determine the predicted supply 220.

Step 908 involves predicting an available capacity 216 for the VM series in the system unit during the upcoming time period based at least in part on the predicted supply 220 and a predicted demand 218. For example, the predicted available capacity 216 may represent the difference between the predicted supply 220 and the predicted demand 218.

Step 910 involves taking at least one mitigation action in response to determining that the predicted demand 218 exceeds the predicted supply 220 during the upcoming time period. As discussed above, there are many different types of mitigation actions that could be taken in accordance with the present disclosure, such as purchasing additional computing resources, enforcing offer restrictions, attempting to recover unhealthy servers 106, migrating lower priority workloads to other system units, and evicting lower priority workloads from the cloud computing system 100.

Figure 10:
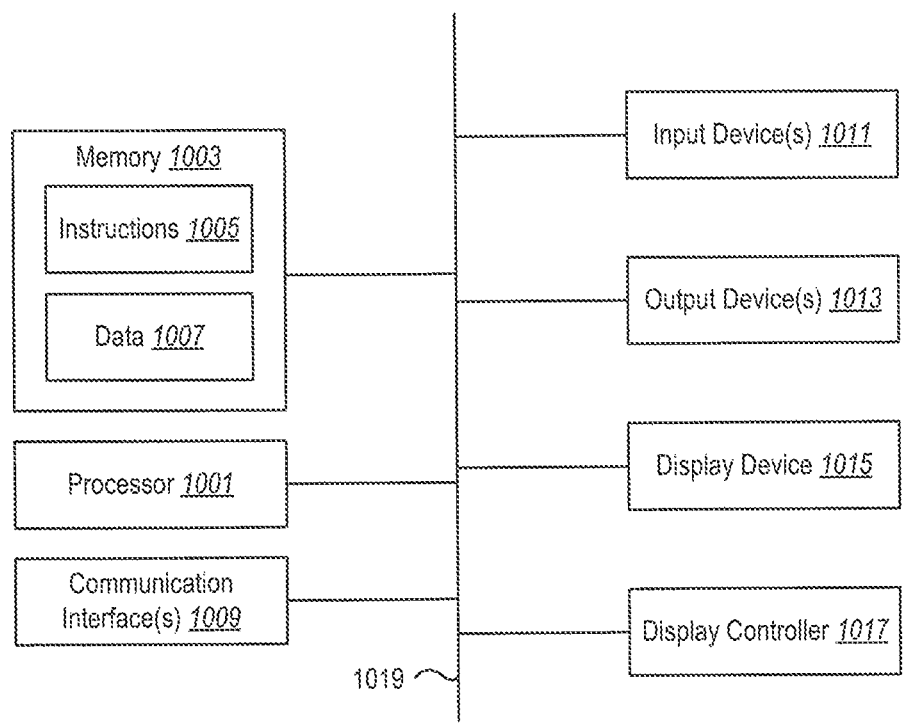
FIG. 10 illustrates certain components that may be included within a computer system that may be used to implement the various devices, components, and systems described herein.

FIG. 10 illustrates certain components that may be included within a computer system 1000. One or more computer systems 1000 may be used to implement the various devices, components, and systems described herein.

The computer system 1000 includes a processor 1001. The processor 1001 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 1001 may be referred to as a central processing unit (CPU). Although just a single processor 1001 is shown in the computer system 1000 of FIG. 10, in an alternative configuration, a combination of processors (e.g., an ARM and DSP) could be used.

The computer system 1000 also includes memory 1003 in electronic communication with the processor 1001. The memory 1003 may be any electronic component capable of storing electronic information. For example, the memory 1003 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 1005 and data 1007 may be stored in the memory 1003. The instructions 1005 may be executable by the processor 1001 to implement some or all of the steps, operations, actions, or other functionality disclosed herein. Executing the instructions 1005 may involve the use of the data 1007 that is stored in the memory 1003. Any of the various examples of modules and components described herein may be implemented, partially or wholly, as instructions 1005 stored in memory 1003 and executed by the processor 1001. Any of the various examples of data described herein may be among the data 1007 that is stored in memory 1003 and used during execution of the instructions 1005 by the processor 1001.

A computer system 1000 may also include one or more communication interfaces 1009 for communicating with other electronic devices. The communication interface(s) 1009 may be based on wired communication technology, wireless communication technology, or both. Some examples of communication interfaces 1009 include a Universal Serial Bus (USB), an Ethernet adapter, a wireless adapter that operates in accordance with an Institute of Electrical and Electronics Engineers (IEEE) 1002.11 wireless communication protocol, a Bluetooth® wireless communication adapter, and an infrared (IR) communication port.

A computer system 1000 may also include one or more input devices 1011 and one or more output devices 1013. Some examples of input devices 1011 include a keyboard, mouse, microphone, remote control device, button, joystick, trackball, touchpad, and lightpen. Some examples of output devices 1013 include a speaker and a printer. One specific type of output device that is typically included in a computer system 1000 is a display device 1015. Display devices 1015 used with embodiments disclosed herein may utilize any suitable image projection technology, such as liquid crystal display (LCD), light-emitting diode (LED), gas plasma, electroluminescence, or the like. A display controller 1017 may also be provided, for converting data 1007 stored in the memory 1003 into text, graphics, and/or moving images (as appropriate) shown on the display device 1015.

The various components of the computer system 1000 may be coupled together by one or more buses, which may include a power bus, a control signal bus, a status signal bus, a data bus, etc. For the sake of clarity, the various buses are illustrated in FIG. 10 as a bus system 1019.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory computer-readable medium having computer-executable instructions stored thereon that, when executed by at least one processor, perform some or all of the steps, operations, actions, or other functionality disclosed herein. The instructions may be organized into routines, programs, objects, components, data structures, etc., which may perform particular tasks and/or implement particular data types, and which may be combined or distributed as desired in various embodiments.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for minimizing allocation failures in cloud computing systems without overprovisioning, comprising:
    operating a system unit of a cloud computing system comprising a first virtual machine series having a first plurality of deployed virtual machines and a second virtual machine series having a second plurality of deployed virtual machines, wherein the first virtual machine series and the second virtual machine series compete for current available capacity for the system unit;
    receiving a request for a new subscription to the first virtual machine series;
    determining a shared available current capacity for the first virtual machine series in the system unit based on sharing the current available capacity for the system unit between the first virtual machine series and the second virtual machine series, wherein the shared available current capacity for the first virtual machine series is proportional to the current available capacity for the system unit and a first demand growth ratio for the first virtual machine series;
    determining a shared available future added capacity for the first virtual machine series in the system unit based on sharing a future added capacity for the system unit between the first virtual machine series and the second virtual machine series, wherein the shared available future added capacity for the first virtual machine series is proportional to the future added capacity for the system unit between the first virtual machine series and the second virtual machine series and the first demand growth ratio for the first virtual machine series;

determining a predicted supply for the first virtual machine series in the system unit during an upcoming time period, wherein the predicted supply is based on the shared available current capacity for the first virtual machine series and the shared available future added capacity for the first virtual machine series;

predicting an available capacity for the first virtual machine series in the system unit during the upcoming time period, wherein the predicted available capacity is based on a predicted demand for the first virtual machine series in the system unit during the upcoming time period and the predicted supply for the first virtual machine series in the system unit during the upcoming time period; and in response to determining that the predicted demand exceeds the predicted supply during the upcoming time period for the first virtual machine series in the system unit, temporarily discontinuing the first virtual machine series to not service the request for the new subscription to the first virtual machine series.

2. The method of claim 1, wherein:

the shared available current capacity for the first virtual machine series comprises an amount of shared available current capacity of the first virtual machine series in the system unit that is available to be allocated to the first virtual machine series and to the second virtual machine series; and the first demand growth ratio is a ratio of how quickly demand for the first virtual machine series is expected to grow in the first virtual machine series in the system unit relative to how quickly demand for the first and second virtual machine series are expected to grow in the first virtual machine series in the system unit.

3. The method of claim 1, further comprising, in response to determining that the predicted demand exceeds the predicted supply during the upcoming time period, migrating lower priority workloads to other system units.

4. The method of claim 1, further comprising determining a plurality of predictions regarding the available capacity for the first virtual machine series in the system unit during the upcoming time period, wherein the plurality of predictions regarding the available capacity is based on a plurality of different demand predictions.

5. The method of claim 1, further comprising:

monitoring the predicted available capacity; and providing an alert when the predicted available capacity changes from indicating a first type of prediction to indicating a second type of prediction for the upcoming time period.

6. The method of claim 5, further comprising:

performing a root-cause analysis to determine why the predicted available capacity changed from indicating the first type of prediction to indicating the second type of prediction in association with the upcoming time period; and providing a root-cause analysis report that describes what was determined during the root-cause analysis.

7. The method of claim 1, further comprising:

monitoring the predicted demand, the current available capacity, and the future added capacity for the first virtual machine series in the system unit; and providing an alert when a value of the predicted demand, the current available capacity, or the future added capacity for the first virtual machine series in the system unit changes by more than a predetermined amount within a predetermined time period.

8. The method of claim 1, further comprising determining the predicted supply for the first virtual machine series in the system unit further based on a shared available current capacity for the second virtual machine series and the shared available future added capacity for the second virtual machine series.

9. A non-transitory computer-readable medium comprising instructions that are executable by one or more processors to cause a computing system to:

receive a request for a new subscription to a first virtual machine series of a system unit in a cloud computing system;

determine a shared available current capacity for the first virtual machine series based on sharing the current available capacity for the system unit between the first virtual machine series and a second virtual machine series of the system unit, wherein the shared available current capacity for the first virtual machine series is proportional to the current available capacity for the system unit and a first demand growth ratio for the first virtual machine series, wherein the first and second virtual machine series each has a plurality of deployed virtual machines, and wherein the first virtual machine series and the second virtual machine series compete for current available capacity for the system unit;

determine a shared available future added capacity for the first virtual machine series in the system unit based on sharing a future added capacity for the system unit between the first virtual machine series and the second virtual machine series, wherein the shared available future added capacity for the first virtual machine series is proportional to the future added capacity for the system unit between the first virtual machine series and the second virtual machine series and the first demand growth ratio for the first virtual machine series;

determine a predicted supply for the first virtual machine series in the system unit during an upcoming time period, wherein the predicted supply is based on the shared available current capacity for the first virtual machine series and the shared available future added capacity for the first virtual machine series;

predict an available capacity for the first virtual machine series in the system unit during the upcoming time period, wherein the predicted available capacity is based on a predicted demand for the first virtual machine series in the system unit during the upcoming time period and the predicted supply for the first virtual machine series in the system unit during the upcoming time period; and in response to determining that the predicted demand exceeds the predicted supply during the upcoming time period for the first virtual machine series in the system unit, temporarily discontinue the first virtual machine series to not service the request for the new subscription to the first virtual machine series.

10. The non-transitory computer-readable medium of claim 9, further comprising additional instructions that are executable by the one or more processors to add additional computing resources for the cloud computing system in response to determining that the predicted demand exceeds the predicted supply during the upcoming time period.

11. The non-transitory computer-readable medium of claim 9, further comprising additional instructions that are executable by the one or more processors to determine a plurality of predictions regarding the available capacity for the first virtual machine series in the system unit during the upcoming time period, wherein the plurality of predictions regarding the available capacity for the system unit is based on a plurality of different demand predictions.

12. The non-transitory computer-readable medium of claim 9, further comprising additional instructions that are executable by the one or more processors to cause the computing system to determine the predicted supply for the first virtual machine series in the system unit based on a shared available current capacity for the second virtual machine series and the shared available future added capacity for the second virtual machine series.

13. The non-transitory computer-readable medium of claim 12, further comprising additional instructions that are executable by the one or more processors to cause the computing system to:
monitor the predicted available capacity to determine when the predicted available capacity changes from indicating a first type of prediction to indicating a second type of prediction;
perform a root-cause analysis to determine why the predicted available capacity changed from indicating the first type of prediction to indicating the second type of prediction during the upcoming time period; and
provide a root-cause analysis report that describes what was determined during the root-cause analysis.

14. The non-transitory computer-readable medium of claim 9, further comprising additional instructions that are executable by the one or more processors to cause the computing system to:
monitor the predicted demand, the current available capacity, and the future added capacity for the first virtual machine series in the system unit; and
provide an alert when a value of the predicted demand, the current available capacity, or the future added capacity for the first virtual machine series in the system unit changes by more than a predetermined amount within a predetermined time period.

15. The non-transitory computer-readable medium of claim 9, further comprising additional instructions that are executable by the one or more processors to cause the computing system to:
perform a root-cause analysis in response to detecting an anomaly within the first virtual machine series in the system unit; and
provide a root-cause analysis report that describes what was determined during the root-cause analysis.

16. A system for minimizing allocation failures in cloud computing systems without overprovisioning, comprising:
one or more processors;
memory in electronic communication with the one or more processors; and
instructions stored in the memory, the instructions being executable by the one or more processors to:
receive a request for a new subscription to a first virtual machine series of a system unit in a cloud computing system;
determine a shared available current capacity for the first virtual machine series based on sharing the current available capacity for the system unit between the first virtual machine series and a second virtual machine series of the system unit, wherein the shared available current capacity for the first virtual machine series is proportional to the current available capacity for the system unit and a first demand growth ratio for the first virtual machine series, wherein the first and second virtual machine series each has a plurality of deployed virtual machines, and wherein the first virtual machine series and the second virtual machine series compete for current available capacity for the system unit;
determine a shared available future added capacity for the first virtual machine series in the system unit based on sharing a future added capacity for the system unit between the first virtual machine series and the second virtual machine series, wherein the shared available future added capacity for the first virtual machine series is proportional to the future added capacity for the system unit between the first virtual machine series and the second virtual machine series and the first demand growth ratio for the first virtual machine series;
determine a predicted supply for the first virtual machine series in the system unit during an upcoming time period, wherein the predicted supply is based on the shared available current capacity for the first virtual machine series and the shared available future added capacity for the first virtual machine series;
predict an available capacity for the first virtual machine series in the system unit during the upcoming time period, wherein the predicted available capacity is based on a predicted demand for the first virtual machine series in the system unit during the upcoming time period and the predicted supply for the first virtual machine series in the system unit during the upcoming time period; and
in response to determining that the predicted demand exceeds the predicted supply during the upcoming time period for the first virtual machine series in the system unit, temporarily discontinue the first virtual machine series to not service the request for the new subscription to the first virtual machine series.

17. The system of claim 16, further comprising additional instructions that are executable by the one or more processors to recover unhealthy servers or evict lower priority workloads in response to determining that the predicted demand exceeds the predicted supply during the upcoming time period.

18. The system of claim 16, further comprising additional instructions that are executable by the one or more processors to:
monitor the predicted demand, the current available capacity, the future added capacity, and the predicted available capacity of the first virtual machine series in the system unit;
provide an alert when the predicted available capacity of the first virtual machine series in the system unit changes from indicating a first type of prediction to indicating a second type of prediction or when an anomaly is detected; and
perform a root-cause analysis in connection with the changes of the first virtual machine series in the system unit.

19. The system of claim 16, further comprising additional instructions that are executable by the one or more processors to determine the predicted supply for the first virtual machine series in the system unit based on a shared available current capacity for the second virtual machine series and the shared available future added capacity for the second virtual machine series.

20. The system of claim 16, wherein:
the shared available current capacity for the first virtual machine series comprises an amount of shared available current capacity of the first virtual machine series in the system unit that is available to be allocated to the first virtual machine series and the second virtual machine series; and
the first demand growth ratio is a ratio of how quickly demand for the first virtual machine series is expected to grow in the first virtual machine series in the system unit relative to how quickly demand for the first and second virtual machine series are expected to grow in the first virtual machine series in the system unit.

* * * * *